(12) United States Patent
Takei et al.

(10) Patent No.: US 7,029,750 B2
(45) Date of Patent: Apr. 18, 2006

(54) THERMOPLASTIC RESIN COMPOSITION AND PRODUCTION METHOD THEREOF

(75) Inventors: Seiji Takei, Tokyo (JP); Masahiro Osuka, Hiroshima-ken (JP); Hideo Aoki, Kawasaki (JP); Mari Sekita, Kawasaki (JP); Masaaki Mouri, Tokyo (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 131 days.

(21) Appl. No.: 10/617,664

(22) Filed: Jul. 14, 2003

(65) Prior Publication Data

US 2005/0014003 A1 Jan. 20, 2005

(51) Int. Cl.
*B32B 5/02* (2006.01)
*B32B 27/18* (2006.01)
*B32B 27/20* (2006.01)
*B32B 27/30* (2006.01)
*B32B 27/32* (2006.01)

(52) U.S. Cl. ............ 428/327; 428/323; 525/191; 525/199; 525/221; 525/222; 525/240; 526/242; 526/250; 526/255

(58) Field of Classification Search ............ 428/403, 428/407, 323, 327; 525/63, 64, 69, 70, 72, 525/78, 86, 191, 199, 221, 222
See application file for complete search history.

(56) References Cited

U.S. PATENT DOCUMENTS

| | | | | |
|---|---|---|---|---|
| 4,174,358 A | * | 11/1979 | Epstein | 525/183 |
| 4,584,344 A | * | 4/1986 | Baer | 525/66 |
| 4,707,513 A | * | 11/1987 | Baer | 524/504 |
| 4,945,126 A | * | 7/1990 | Crosby et al. | 524/507 |
| 5,006,601 A | * | 4/1991 | Lutz et al. | 525/66 |
| 5,030,667 A | * | 7/1991 | Shimizu et al. | 523/201 |
| 5,075,366 A | * | 12/1991 | Moltrasio | 524/306 |
| 5,164,426 A | * | 11/1992 | Shimizu et al. | 523/201 |
| 5,208,292 A | * | 5/1993 | Hert et al. | 525/166 |
| 5,296,165 A | * | 3/1994 | Shimizu et al. | 516/77 |
| 5,308,892 A | * | 5/1994 | Zickler et al. | 523/318 |
| 5,407,999 A | * | 4/1995 | Hert et al. | 525/166 |
| 5,645,603 A | * | 7/1997 | Peters | 623/23.61 |
| 5,679,741 A | * | 10/1997 | Breton et al. | 525/71 |

FOREIGN PATENT DOCUMENTS

| | | |
|---|---|---|
| JP | 2-50137 | 11/1990 |
| JP | 6-62826 | 8/1994 |
| JP | 9-208798 | 8/1997 |
| JP | 10-87928 | 4/1998 |
| JP | 2002-327124 | * 11/2002 |

* cited by examiner

*Primary Examiner*—Vivian Chen
(74) *Attorney, Agent, or Firm*—Oblon, Spivak, McClelland, Maier & Neustadt, P.C.

(57) ABSTRACT

The present invention provides a thermoplastic resin composition comprising a thermoplastic resin (A), an acrylic polymer (B), a polytetrafluoroethylene-containing powder mixture (C) and a filler (D), the amount of the acrylic polymer (B) being from 0.1 to 400 parts by weight, the amount of the filler (D) being from 1 to 2000 parts by weight, based on 100 parts by weight of the thermoplastic resin (A), and the amount of a polytetrafluoroethylene component in the polytetrafluoroethylene-containing powder mixture (C) is from 0.01 to 400 parts by weight based on 100 parts by weight of the thermoplastic resin (A).

11 Claims, No Drawings

THERMOPLASTIC RESIN COMPOSITION AND PRODUCTION METHOD THEREOF

BACKGROUND OF THE INVENTION

1. Field of the Invention

The present invention relates to a thermoplastic resin composition containing various fillers added therein, a production method thereof, and a molded article.

2. Description of Related Art

Thermoplastic resin has been widely used in various fields such as soft or hard films, sheets, flooring materials, and formed articles.

Thermoplastic resin is molded by various methods such as extrusion molding, calender molding, blow molding, and injection molding according to the desired products. In this case, various fillers are added to impart various characteristics. Examples of the fillers include impact strength modifiers, fillers, flame retardants, pigments, and wood flours, papers and fiber used as extenders. Recently, reuse of waste papers and regenerated wood flours has been investigated.

However, when a large amount of filler is added to exert the effect of the fillers, adhesion of degraded resin or fillers in the resin onto lips of a die (die deposit) and migration of fillers in a resin composition onto the metal surface in contact with the resin (plate-out) occur during molding, thereby causing surface irregularities and filler specks and a reduction in impact strength. When the amount of filler is 10 parts by weight based on 100 parts by weight of the thermoplastic resin, these defects are frequently observed.

To solve these problems, processing aids to be added to the thermoplastic resin are widely investigated in Japanese Patent Application, Second Publication No. Hei 6-62826and Japanese Patent Application, Second Publication No. Hei 2-50137 with respect to a polyvinyl chloride resin composition, Japanese Patent Application, First Publication No. Hei 9-208798 with respect to an ABS resin composition, and Japanese Patent Application, First Publication No. Hei 10-87928 with respect to a styrene-based resin composition, and thus calendering roll releasability and retention deterioration of the resin have been improved to some extent.

However, in the case of the molding of a thermoplastic resin and/or a regenerated thermoplastic resin, particularly extrusion molding, calender molding and blow molding of a thermoplastic resin composition containing various fillers such as rubbers, regenerated wood flours, waste papers, flame retardants, and pigments, die deposit and plate-out are not sufficiently suppressed.

Since die deposit and plate-out may deteriorate the appearance of a molded article or make it impossible to carry out the subsequent molding, die lips must be cleaned after terminating the molding operation at fixed intervals and productivity is drastically reduced. There can also be employed a method of suppressing die deposit and plate-out by previously adding lubricants such as acrylic external lubricant, metal soap, and wax to a thermoplastic resin; however, sufficient additional effect is not always exerted.

SUMMARY OF THE INVENTION

To solve the problems described above, the present inventors have intensively reseached and found that when a polytetrafluoroethylene-containing powder mixture and an acrylic polymer are added to a thermoplastic resin, die deposit and plate-out do not occur during molding even when fillers are added. It was also found that, when using such a thermoplastic resin, it is made possible to obtain a molded article having excellent appearance without causing surface irregularities and filler specks and reduction of the impact strength. Thus, the present invention has been completed.

The present invention provides a thermoplastic resin composition comprising a thermoplastic resin (A), an acrylic polymer (B), a polytetrafluoroethylene-containing powder mixture (C) and a filler (D), an amount of the acrylic polymer (B) being from 0.1 to 400 parts by weight, an amount of the filler (D) being from 1 to 2000 parts by weight, based on 100 parts by weight of the thermoplastic resin (A), wherein an amount of a polytetrafluoroethylene component in the polytetrafluoroethylene-containing powder mixture (C) is from 0.01 to 400 parts by weight based on 100 parts by weight of the thermoplastic resin (A).

The thermoplastic resin (A) can contain 0.1 to 100% byweight of a modified polyolefin resin (E).

The acrylic polymer (B) comprises an acrylic monomer (b-1) containing an alkyl methacrylate and/or an alkyl acrylate, an alkyl group of which has 1 to 18 carbon atoms, and a reduced viscosity ($\eta$ sp/C) at 25° C. of a solution prepared by dissolving 0.1 g of the acrylic polymer in 100 ml of chloroform is preferably 15 or less, and more preferably 3 or less.

The acrylic monomer (b-1) can further contain a vinyl monomer which is copolymerizable with the alkyl methacrylate and/or the alkyl acrylate, an alkyl group of which has 1 to 18 carbon atoms.

The polytetrafluoroethylene-containing powder mixture (C) can contain polytetrafluoroethylene particles having a particle size of 10 μm or less and an organic polymer.

The polytetrafluoroethylene-containing powder mixture (C) can be produced by mixing an aqueous dispersion of polytetrafluoroethylene particles having a particle size of 0.05 to 1.0 μm with an aqueous organic polymer dispersion and solidifying or spray drying the resultant to obtain powder.

The polytetrafluoroethylene-containing powder mixture (C) can be produced by polymerizing a monomer (c-1) constituting the organic polymer in the presence of the aqueous dispersion of polytetrafluoroethylene particles having a particle size of 0.05 to 1.0 μm and solidifying or spray drying the resultant to obtain powder.

The polytetrafluoroethylene-containing powder mixture (C) can be produced by subjecting a monomer (c-2) having an unsaturated ethylenic bond to emulsion polymerization in a dispersion prepared by mixing an aqueous dispersion of polytetrafluoroethylene particles having a particle size of 0.05 to 1.0 μm with an aqueous organic polymer dispersion and solidifying or spray drying the resultant to obtain powder.

Also the present invention provides a molded article comprising the thermoplastic resin composition described above.

Also the present invention provides a method of producing the thermoplastic resin composition described above, which comprises the steps of: producing master pellets containing a portion of a thermoplastic resin (A), an acrylic polymer (B) and a polytetrafluoroethylene-containing powder mixture (C), and mixing the remaining thermoplastic resin (A) and a filler (D) with the resulting master pellets.

Also the present invention provides a method of improving moldability of a thermoplastic resin composition comprising 100 parts by weight of a thermoplastic resin (A), 0.1 to 400 parts by weight of an acrylic polymer (B), a polytetrafluoroethylene-containing powder mixture (C) and 1 to 2000 parts by weight of a filler (D), which comprises the step of: adding the polytetrafluoroethylene-containing powder mixture (C) so that an amount of a polytetrafluoroethylene component in the polytetrafluoroethylene-containing powder mixture (C) is from 0.01 to 400 parts by weight based on 100 parts by weight of the thermoplastic resin (A).

DETAILED DESCRIPTION OF THE INVENTION

The present invention will be described in detail below.

In the present invention, various thermoplastic resins can be used as the thermoplastic resin (A).

Examples thereof include polypropylene (PP), high-density polyethylene (HDPE), low-density polyethylene (LDPE), linear low-density polyethylene (LLDPE), polyvinyl chloride resin (PVC), styrene-based resin such as polystyrene (PS), impact-resistant polystyrene (HIPS), or styrene/acrylonitrile copolymer resin (SAN), rubber-reinforced styrene/acrylonitrile copolymer resin (ABS, ASA, SAS), methacryl resin, polycarbonate (PC), polybutylene terephthalate (PBT), polyethylene terephthalate (PET), polybutylene naphthalate (PBN), polyethylene naphthalate (PEN), polycyclohexane terephthalate (PCT), polyphenylene ether resin (PPE) and a modified resin thereof, polyamide resin (PA) such as polycaproamide (nylon 6) or polyhexamethylene adipamide (nylon 66), biodegradable resin such as polylactic acid, polycaprolactone, polyvinyl alcohol, modified starch, or polyhydroxybutyric acid, random copolymer or block copolymer of poly-1-butene, polyisobutylene or propylene and ethylene and/or 1-butene in any mixing ratio, ethylene-propylene-diene terpolymer of ethylene and propylene in any mixing ratio in which an amount of a diene component is 50% by weight or less, cyclic polyolefin such as copolymer of polymethylpentene or cyclopentadiene and ethylene and/or propylene, and random copolymer, block copolymer or graft polymer of ethylene or propylene and 50% by weight of vinyl compound such as vinyl acetate, alkyl methacrylate ester, acrylate ester, aromatic alkyl ester, or aromatic vinyl.

Among these, at least one kind selected from PP, HDPE, LDPE, LLDPE, PVC, PS, HIPS, AS, ABS, ASA, SAS, methacryl resin, PC, PBT, PET, PBN, PEN, PCT, ethylene-propylene random, and block copolymer is preferably in view of flexibility of purpose and low cost. Among these, at least one kind selected from polyethylene resins, polypropylene resins and styrene-based resins is more preferable.

As the thermoplastic resin (A), a regenerated resin material can be used alone or in combination with a non-regenerated resin material. As the regenerated resin material, resins parts, for example, resin automobile parts such as bumpers, door trim, instrument panel interior materials, and shell platings, recycled PET bottle articles, and housings of appliances such as televisions, personal computers, and printers can be used. In particular, an automobile bumper made of polyolefin is preferable in view of recyclability.

As the thermoplastic resin (A), an alkyl (meth)acrylate, which has conventionally been added to improve compatibility between fillers and a thermoplastic resin, can be used in combination with a modified polyolefin resin (E) modified with an organic acid such as maleic anhydride, acrylic acid, or glycidyl methacrylate.

The alkyl (meth)acrylate modified polyolefin resin comprises ethylene and various acrylate esters or various methacrylate esters, such as ethylene-methyl methacrylate, ethylene-ethyl acrylate, ethylene-methyl acrylate, ethylene-butyl methacrylate, ethylene-hexyl acrylate, ethylene-lauryl methacrylate, and ethylene-stearyl acrylate, and preferably a copolymer comprising 99 to 60% by weight of ethylene and 1 to 40% by weight of methyl methacrylate, and one or blends of two or more kinds of these compounds can be listed.

Examples of the organic acid-modified polyolefin include polyolefins modified with a compound for modification such as maleic anhydride, dimethylmaleate, diethylmaleate, acrylic acid, methacrylic acid, tetrahydrophthalic acid, glycidyl methacrylate, or hydroxyethyl methacrylate, and an amount (modification amount) of the compound for modification introduced is 0.1 to 60% by weight based on the polyolefin before modification.

These modified polyolefin resins can be used alone or in combination thereof and are contained in the thermoplastic resin (A) in an amount of 0.1 to 100% by weight, and preferably 0.2 to 30% by weight.

The acrylic polymer (B) used in the present invention is added to the thermoplastic resin composition in order to enhance the lubricity of the thermoplastic resin composition and is obtained by polymerizing an acrylic monomer (b-1). The acrylic monomer (b-1) preferably contains an alkyl methacrylate and/or an alkyl acrylate, an alkyl group of which has 1 to 18 carbon atoms.

Examples of the alkyl methacrylate and the alkyl acrylate include methyl methacrylate, ethyl methacrylate, butyl methacrylate, 2-ethylhexylmethacrylate, cyclohexylmethacrylate, benzyl methacrylate, phenyl methacrylate, methyl acrylate, ethyl acrylate, propyl acrylate, butyl acrylate, hexyl acrylate, 2-ethylhexyl acrylate, cyclohexyl acrylate, benzyl acrylate, and phenyl acrylate. An alkyl methacrylate and/or an alkyl acrylate, an alkyl group of which has 19 or more carbon atoms, tend to copolymerize with difficulty.

Also the acrylic monomer (b-1) may contain a vinyl monomer copolymerizable with the alkyl methacrylate and/or the alkyl acrylate, an alkyl group of which has 1 to 18 carbon atoms. Examples of the vinyl monomer include styrene, α-methylstyrene, acrylonitrile, and vinyl acetate.

With respect to preferable mixing ratio of the alkyl methacrylate and/or the alkyl acrylate and the vinyl monomer copolymerizable with them in the acrylic monomer (b-1), the proportion of the alkyl methacrylate is from 40 to 95% by weight, the proportion of the alkyl acrylate is from 5 to 60% by weight, and the proportion of the vinyl monomer is from 0 to 30% by weight. When the mixing ratio thereof is within the above range in the acrylic monomer (b-1), the lubricity of the thermoplastic resin composition is enhanced and it is possible to effectively prevent die deposit and plate-out from occurring during molding.

The acrylic polymer (B) preferably has a reduced viscosity ($\eta$ sp/C) of 15 or less, and more preferably 3 or less. When the reduced viscosity ($\eta$ sp/C) exceeds 15, the appearance of the molded article tends to deteriorate. As used herein, the term "reduced viscosity ($\eta$ sp/C)" means a value as measured at 25° C. using a solution prepared by dissolving 0.1 g of a polymer in 100 ml of chloroform.

As the method of producing the acrylic polymer (B), an emulsion polymerization method is most preferable and the polymerization can be conducted in a single or multiple stage. To reconcile the lubricity and dispersibility, the polymerization is preferably conducted in two or three stages.

The acrylic polymer (B) can be obtained in the form of powders by treating the acrylic polymer (B) latex obtained by the emulsion polymerization method according to a rapid solidification method using an acid or a salt.

The resulting acrylic polymer (B) is effectively used in the thermoplastic resin composition even in the form of powders. However, since the thermoplastic resin (A) as a matrix resin is often in the form of bead-like particles or pellets, the acrylic polymer (B) is preferably formed into granular powders in order to suppress classification during mixing with the matrix resin. More preferably, the acrylic polymer is formed into pelletized particles.

Examples of the means for forming into granular powders include a solvent method of adding a solvent during solidification with acids or salts and forming into granules by precipitating acids, a slow solidification method of solidifying under slow conditions using acids or salts and forming into granules by precipitating acids, and a spray drying method of spraying a latex into a gas flow at high temperature and drying to form granular powders.

Examples of the means for forming into pelletized powders include a piston granulation method using an extruder, a roll pelletization method of cutting a roll sheet to obtain cubic pellets, and a means for pelletizing by pelettizing using a briquetting roll with a pellet-like recess. In this case, it is preferable that the latex be pelletized by compressing as slow as possible in order to improve the dispersibility during molding. The pelletization may be conducted by a granulation method using an adhesive agent. As the adhesive agent, commonly used liquid paraffin and DOP (dioctyl phthalate) can be used and the amount of the adhesive agent is preferably controlled to 50% by weight or less.

The pelletized particles may be used after previously diluting with a thermoplastic resin and forming into pellets in order to further improve the dispersibility in the resin composition during molding. In that case, the amount of the thermoplastic resin in the pellets is preferably 70% by weight or less, and more preferably from 30 to 60% by weight. An amount greater than 70% by weight is not preferable because the amount of the acrylic polymer (B) in the pellets is small and the productivity per acrylic polymer (B) is reduced. The thermoplastic resin used for dilution needs not be the same as the matrix resin as long as it is dispersed in the resin composition during molding, and a thermoplastic resin comprising a non-polar component is preferable.

The amount of the acrylic polymer (B) is from 0.1 to 400 parts by weight based on 100 parts by weight of the thermoplastic resin (A). When the amount of the acrylic polymer (B) is less than 0.1 parts by weight, the lubricity of the thermoplastic resin composition is not sufficiently improved. On the other hand, when the amount exceeds 400 parts by weight, a granular structure is formed on the molded article and the appearance deteriorates. More preferably, the amount of the acrylic polymer (B) is from 0.5 to 360 parts by weight based on 100 parts by weight of the thermoplastic resin (A). When using in the form of pellets after previously diluting the acrylic polymer (B) with the thermoplastic resin, the amount of the thermoplastic resin used for dilution is included as a portion of the thermoplastic resin (A).

The polytetrafluoroethylene-containing powder mixture (C) used in the present invention comprises polytetrafluoroethylene particles, preferably polytetrafluoroethylene particles having a particle size of 10 μm or less, and an organic polymer. In the present invention, polytetrafluoroethylene aggregates of 10 μm or more are not produced in the polytetrafluoroethylene-containing powder mixture (C).

Although commonly used polytetrafluoroethylene fine powder cannot be easily dispersed in a uniform manner in thermoplastic resin because of production of aggregates of 100 μm or more during the process of recovering the powder from the particle dispersion. The polytetrafluoroethylene-containing powder mixture (C) used in the present invention has very superior dispersibility in the thermoplastic resin, particularly a styrene resin, because the polytetrafluoroethylene alone does not form domains exceeding a particle size of 10 μm. Therefore, the thermoplastic resin composition, particularly a styrene-based resin composition, of the present invention, polytetrafluoroethylene is efficiently formed into fiber in the resin, and the thermoplastic resin composition is excellent in various moldabilities and surface characteristics.

The amount of polytetrafluoroethylene in the polytetrafluoroethylene-containing powder mixture (C) used in the present invention is preferably from 0.1 to 90% by weight, and more preferably from 20 to 60% by weight.

The polytetrafluoroethylene-containing powder mixture (C) can be obtained by a method of mixing an aqueous dispersion of polytetrafluoroethylene particles having a particle size of 0.05 to 1.0 μm with an aqueous organic polymer dispersion and powderizing the mixture by solidification or spray drying, a method of polymerizing a monomer (c-1) constituting an organic polymer in the presence of an aqueous dispersion of polytetrafluoroethylene particles having a particle size of 0.05 to 1.0 μm and powderizing the resulting polymer by means of solidification or spray drying, or a method of emulsion-polymerizing a monomer (c-2) having an unsaturated ethylenic bond in a dispersion prepared by mixing an aqueous dispersion of polytetrafluoroethylene particles having a particle size of 0.05 to 1.0 μm with an aqueous organic polymer dispersion and powderizing the resulting polymer by means of solidification or spray drying.

In the method of powderizing by solidification, a latex is added in hot water containing a metal salt such as calcium chloride or magnesium sulfate dissolved therein.

The aqueous dispersion of polytetrafluoroethylene particles having a particle size of 0.05 to 1.0 μm used to produce the polytetrafluoroethylene-containing powder mixture (C) is obtained by polymerizing a tetrafluoroethylene monomer by means of emulsion polymerization using a fluorine-containing surfactant.

During the emulsion polymerization, as long as characteristics of polytetrafluoroethylene are not adversely affected, a fluorine-containing olefin such as hexafluoropropylene, chlorotrifluoroethylene, fluoroalkylethylene, or perfluoroalkylvinyl ether, and a fluorine-containing alkyl (meth)acrylate such as perfluoroalkyl (meth)acrylate can be used as a copolymer component. The amount of these copolymer components is preferably 10% by weight or less based on the amount of tetrafluoroethylene.

Examples of commercially available polytetrafluoroethylene particle dispersions include "FLUON AD-1" and "FLUON AD-936" manufactured by Asahi ICI Fluoropolymers Co., Ltd., "POLYFLON D-1" and "POLYFLON D-2" manufactured by Daikin Industries Co., Ltd., and "TEFLON® 30J" manufactured by Mitsui-DuPont Fluorochemicals Co., Ltd.

The organic polymer constituting the polytetrafluoroethylene-containing powder mixture (C) is not specifically limited, but has preferably high affinity with various resins in view of the dispersibility during mixing with the thermoplastic resin.

Specific examples of the monomer (c-1) for formation of the organic polymer include aromatic vinyl monomers such as styrene, α-methylstyrene, p-methylstyrene, o-methylstyrene, t-butylstyrene, o-ethylstyrene, p-chlorostyrene, o-chlorostyrene, 2,4-dichlorostyrene, p-methoxystyrene, o-methoxystyrene, and 2,4-dimethylstyrene; (meth)acrylate ester monomers such as methyl acrylate, methyl methacrylate, ethyl acrylate, ethyl methacrylate, butyl acrylate, butylmethacrylate, 2-ethylhexyl acrylate, 2-ethylhexyl methacrylate, dodecyl acrylate, dodecyl methacrylate, tridecyl acrylate, tridecyl methacrylate, octadecyl acrylate, octadecyl methacrylate, cyclohexyl acrylate, and cyclohexyl methacrylate; vinyl cyanate monomers such as acrylonitrile and methacrylonitrile; α,β-unsaturated carboxylic acids such as maleic anhydride; maleimide monomer such as N-phenylmaleimide, N-methylmaleimide, and N-cyclohexylmaleimide; glycidyl group-containing monomers such as glycidyl methacrylate; vinyl ether monomers such as vinylmethyl ether, and vinyl ethyl ether; vinyl carboxylate monomers such as vinyl acetate and vinyl butyrate; olefinic monomers such as ethylene, propylene, and isobutylene; and diene monomers such as butadiene, isoprene, and dimethylbutadiene.

These monomers can be used alone, or two or more kinds of them can be used in combination. When using, as the thermoplastic resin (A) which is a matrix resin, styrene-based resin, polypropylene resin, and polyethylene resin, aromatic vinyl monomers, (meth)acrylate ester monomers and vinyl cyanate monomers are preferably used in the monomer (c-1) in view of the affinity. A particularly preferable monomer is a monomer (c-1) containing 10% by weight or more of one or more kinds of monomers selected from the group consisting of styrene, butyl acrylate, and acrylonitrile.

Examples of the monomer (c-2) having an unsaturated ethylenic bond used to produce the polytetrafluoroethylene-containing powder mixture (C) include aromatic vinyl monomer, (meth)acrylate ester monomer, and vinyl cyanate monomer.

The polytetrafluoroethylene-containing powder mixture (C) is mixed so that the amount of the polytetrafluoroethylene component is from 0.01 to 400 parts by weight based on 100 parts by weight of the polytetrafluoroethylene component is from 0.1 to 200 parts by weight based on 100 parts by weight of the thermoplastic resin (A). When the amount of the polytetrafluoroethylene component is less than 0.01 parts by weight, die deposit and plate-out occur when the thermoplastic resin composition is molded, resulting in poor appearance. Also surface irregularities are observed on the molded article surface and the impact strength is lowered. When the amount of the polytetrafluoroethylene component exceeds 400 parts by weight, the rubber elasticity becomes too high during melting of the thermoplastic resin composition and the surface appearance may deteriorate.

Examples of the material used in the filler (D) of the present invention for the purpose of exerting the effect of physical properties and the extending effect include metallic powder, oxide, hydroxide, silicic acid or silicate, carbonate, silicon carbide, plant fibers, animal fibers, and synthetic fibers. Typical examples thereof include aluminum powder, copper powder, iron powder, alumina, natural wood, paper, calcium carbonate, talc, glass fiber, magnesium carbonate, mica, kaolin, calcium sulfate, barium sulfate, aluminum hydroxide, magnesium hydroxide, silica, clay, zeolite, acetate powder, silk powder, aramid fiber, azodicarbonamide, graphite, and regenerated filler material. These materials can be used alone, or two or more kinds of them can be used in combination.

Examples of the regenerated filler material used in the filler (D) include agricultural product wastes such as chaff, bran, rice bran, corn scrap, dried stem of taro plant, defatted soybean, walnut husk, coconut husk, Susoko (residue from powdered grains remaining on a sieve), and bagasse; distillation lees of distilled alcoholic liquor such as shochu; brewing lees such as beer malt lees, grape lees, sake lees, and soy sauce lees; various lees from beverage factories, such as used tea leaves, coffee lees, and strained lees of citrus fruits; food processing wastes such as bean-curd refuse and chlorella; fishery wastes, for example, shells such as oyster shell, and shells of shrimp and crab; woody wastes such as sawdust, log waste, bark, cut bamboo, and waste lumber produced during dismantling of wooden building; and waste papers and wastes such as waste pulp and pieces of paper produced during the paper-making process. These recovered filler materials can be used alone, or two or more kinds of them can be used in combination.

Examples of the flame retardant used in the filler (D) include antimony oxide, titanium phosphate, vinyl bromide, chlorinated paraffin, decabromodiphenyl, decabromophenol oxide, TBA epoxy oligomer, TBA polycarbonate oligomer, TPP, phosphate ester, hexabromobenzene, aluminum hydroxide, and magnesium hydroxide. These flame retardants can be used alone, or two or more kinds of them can be used in combination.

Examples of the pigment used in the filler (D) include titanium white, titanium yellow, red iron oxide, cobalt blue, and carbon black. These pigments can be used alone, or two or more kinds of them can be used in combination.

In the present invention, a foaming agent can be used in the filler (D). Typical examples thereof include inorganic foaming agent, volatile foaming agent, and decomposable foaming agent. Examples of the inorganic foaming agent include carbon dioxide, air, and nitrogen and examples of the volatile foaming agent include aliphatic hydrocarbons such as propane, n-butane, isobutane, pentane, and hexane; and halogenated hydrocarbons such as trichlorofluoromethane, dichlorofluoromethane, dichlorotetrafluoroethane, methyl chloride, ethyl chloride, and methylene chloride. Examples of the decomposable foaming agent include azodicarbonamide, dinitrosopentamethylenetetramine, azobisisobutyronitrile, and sodium bicarbonate. These foaming agents can be used after appropriately mixing.

When using the foaming agent, a foam stabilizer may be further added in a kneaded melt of the thermoplastic resin composition. Examples of the foam stabilizer include organic powders such as talc and silica, acidic salt of polyhydric carboxylic acid, reaction mixture of polyhydric carboxylic acid and sodium carbonate or sodium hydrogencarbonate, and citric acid.

The filler (D) is mixed in the amount from 1 to 2000 parts by weight based on 100 parts by weight of the thermoplastic resin (A). When the amount of the filler (D) is less than 1 part by weight, the effect of improving the moldability tends to be lowered. On the other hand, when the amount exceeds 2000 parts by weight, the appearance tends to deteriorate.

If necessary, various additives can be added to the thermoplastic resin composition of the present invention.

Examples of the stabilizer include phenolic stabilizers such as
pentaerythritol-tetrakis{3-(3,5-di-t-butyl-4-hydroxyphenyl) propionate} and
triethyleneglycol-bis{3-(3-t-butyl-5-methyl-4-hydroxyphenyl)propionate}; phosphoric stabilizers such as tris (monononylphenyl) phosphite and tris (2,4-di-t-butylphenyl) phosphite; and sulfuric stabilizers such as dilauroyl dipropionate. These stabilizers can be used alone, or two or more kinds thereof can be used in combination.

As long as the objects of the present invention are not adversely affected, more preferable physical properties and characteristics can be imparted by appropriately adding various additives, for example, phenolic antioxidants such as 2,6-di-butyl-4-methylphenol and
4,4'-butylidene-bis(3-methyl-6-t-butylphenol); phosphite antioxidants such as tris (mixed, mono- and diphenyl) phosphite and diphenyl-isodecyl phosphite; phosphoric antioxidants such as dilauryl thiodipropionate, dimyrystyl thiodipropionate, and diastearyl thiodipropionate; benzotriazole ultraviolet absorbers such as 2-hydroxy-4-octoxybenzophenone and
2-(2-hydroxy-5-methylphenyl)benzotriazole; photostabilizers such as bis(2,2,6,6)-tetramethyl-4-piperidinyl); antistatic agents such as hydroxylalkylamine and sulfonate; and lubricants such as ethylenebisstearylamide and metal soap.

A thermoplastic resin composition can be prepared by mixing the above-described essential components with a predetermined amount of optional components, for example, mixing 100 parts by weight of a thermoplastic resin (A), 0.1 to 400 parts by weight of an acrylic polymer (B) and a polytetrafluoroethylene-containing powder mixture (C) so that a polytetrafluoroethylene component in the polytetrafluoroethylene-containing powder mixture (C) is from 0.01 to 400 parts by weight based on 100 parts by weight of the thermoplastic resin (A), adding 1 to 2000 parts by weight of a filler (D) and kneading the mixture using a conventional kneader such as roll, Banbury mixer, single-screw extruder, or twin-screw extruder. In this case, a thermoplastic resin composition having superior in dispersibility of the respective components can be obtained by previously producing master pellets comprising a portion of a thermoplastic resin (A), an acrylic polymer (B) and a polytetrafluoroethylene-containing powder mixture (C) and mixing the remaining thermoplastic resin and a filler (D) with the resulting master pellets. The resulting thermoplastic resin composition is appropriately formed into pellets.

The thermoplastic resin composition of the present invention can be applied to various molding methods such as injection molding, calender molding, blow molding, extrusion molding, thermoforming, expansion molding, and melt spinning. Examples of the molded article include injection molded article, sheet, film, hollow molded article, pipe, square bar, shaped articles, thermoformed article, foam, and fiber. Particularly in the case of the extrusion molding, it is possible to suppress die deposit and plate-out from occurring and the resulting extrusion-molded article has excellent appearance in which surface irregularities and filler specks are not observed and the impact strength does not decrease.

In the extrusion molding, a common extruding equipment can be used and examples thereof include single-screw extruder, parallel twin-screw extruder, and conical twin-screw extruder. As a die mounted at a tip of an extruder, a commonly used die can be used without any limitation.

As described above, it is possible to obtain a molded article, which does not cause die deposit and plate-out even when the filler (D) is added and also has excellent appearance in which surface irregularities and filler specks are not observed and the impact strength does not decrease, by molding a thermoplastic resin composition obtained by mixing 100 parts by weight of a thermoplastic resin (A), 0.1 to 400 parts by weight of an acrylic polymer (B) and a polytetrafluoroethylene-containing powder mixture (C) so that a polytetrafluoroethylene component in the polytetrafluoroethylene-containing powder mixture (C) is from 0.01 to 400 parts by weight based on 100 parts by weight of the thermoplastic resin (A), and adding 1 to 2000 parts by weight of a filler (D). Thus, the moldability can be improved.

EXAMPLES

The present invention will now be described by way of examples, but is not limited by these examples. In the following examples, parts are by weight unless otherwise specified.

Reference Example 1

Acrylic Polymer (B-1)

In a reactor equipped with a stirrer and a reflux condenser, 280 parts of deionized water, 1.5 parts of potassium alkenyl succinate, 2 parts of ammonium persulfate, 20 parts of methyl methacrylate and 0.05 parts of n-octylmercaptan were charged and, after the atmosphere in the reactor was replaced by nitrogen, the mixture was heated to 65° C. while being stirred and was then held heated while being stirred for 2 hours.

Subsequently, a mixture of 30 parts of n-butyl methacrylate, 30 parts of n-butyl acrylate and 0.5 parts of n-octylmercaptan was added dropwise over one hour and, after the completion of the dropwise addition, the mixture was further stirred for 2 hours.

In the reaction system, a mixture of 20 parts of methyl methacrylate and 0.03 parts of n-octylmercaptan was added over 30 minutes, and then the reaction was completed by stirring for 2 hours to obtain a copolymer particle dispersion (hereinafter referred to as P-3). This acrylic polymer had a reduced viscosity ($\eta$ sp/C) of 0.8.

In a reactor equipped with a stirrer, 600 parts of deionized water and 3 parts of sulfuric acid were charged and, after heating to 50° C., P-3 prepared in the above process was added over 5 minutes while stirring. After the completion of the addition, the reaction solution was heated to 95° C., held for 5 minutes, filtered, washed and then dried to obtain an acrylic polymer (B-1).

Reference Example 2

Acrylic Polymer (B-2)

In a reactor equipped with a stirrer and a reflux condenser, 280 parts of deionized water, 1.5 parts of potassium alkenyl succinate, 2 parts of ammonium persulfate, 85 parts of methyl methacrylate, 15 parts of n-butyl acrylate and 0.03 parts of n-octylmercaptan were charged and, after the atmosphere in the reactor was replaced by nitrogen, the mixture was heated to 65° C. while stirring, and then the reaction was completed by heating while stirring for 4 hours to obtain a copolymer particle dispersion (hereinafter referred to as P-4). This acrylic polymer had a reduced viscosity ($\eta$ sp/C) of 8.0.

In a reactor equipped with a stirrer, 600 parts of deionized water and 3 parts of sulfuric acid were charged and, after heating to 50° C., P-4 prepared in the above process was added over 5 minutes while stirring. After the completion of the addition, the reaction solution was heated to 95° C., held for 5 minutes, filtered, washed and then dried to obtain an acrylic polymer (B-2).

Reference Example 3

Polytetrafluoroethylene-Containing Powder Mixture (C-1)

In a separable flask equipped with a stirrer, a condenser, a thermocouple and a nitrogen inlet, 190 parts of distilled water, 1.5 parts of sodium dodecylbenzenesulfonate, 100 parts of styrene and 0.5 parts of cumene hydroperoxide were charged and the mixture was heated to 40° C. in a nitrogen gas flow. Then, a mixed solution of 0.001 parts of iron sulfate, 0.003 parts of disodium ethylenediaminetetraacetate, 0.24 parts of rongalite salt and 10 parts of distilled water was added for radical polymerization. After the completion of heat evolution, the polymerization was completed by maintaining the temperature in the system at 40° C. for one hour to obtain a styrene polymer particle dispersion (hereinafter referred to as P-1).

The solid concentration of the styrene polymer particle dispersion (P-1) was 33.3% by weight and the particle size distribution showed a single peak, and the weight average particle size was 96 nm.

As the polytetrafluoroethylene particle dispersion, "FLUON AD936" manufactured by Asahi ICI Fluoropolymers Co., Ltd. was used. "FLUON AD936" has the solid concentration of 63.0% by weight and contains polyoxyethylenealkylphenyl ether in an amount of 5 parts based on 100 parts of polytetrafluoroethylene. The particle size distribution of "FLUON AD936" showed a single peak and the weight average particle size was 290 nm.

In 833 parts of "FLUON AD936", 1167 parts of distilled water was added to obtain a polytetrafluoroethylene particle dispersion (F-1) having the solid concentration of 26.2% by weight.

The polytetrafluoroethylene particle dispersion (F-1) contains 25% by weight of polytetrafluoroethylene particles and 1.2% by weight of polyoxyethylene nonyl phenyl ether.

160 Parts of F-1 (40 parts of polytetrafluoroethylene) and 181.8 parts of P-1 (60 parts of polystyrene) were charged in a separable flask equipped with a stirrer, a condenser, a thermocouple and a nitrogen inlet and the mixture was stirred in a nitrogen gas flow at room temperature for one hour. Then, the system was heated to 80° C. and maintained for one hour. No separation of solids was observed throughout the series of procedures, and a uniform particle dispersion was obtained. The solid concentration of the resulting particle dispersion was 29.3% by weight, and the particle size distribution was relatively broad and the weight average particle size was 168 nm.

After charging 341.8 parts of this particle dispersion into 700 parts of hot water containing 5 parts of calcium chloride at 85° C., the solids were separated, filtered and dried to obtain 98 parts of a polytetrafluoroethylene-containing powder mixture (C-1).

The dried polytetrafluoroethylene-containing powder mixture (C-1) was shaped into a thin strip using a press molding machine at 250° C. and then cut into super thin sections using a microtome, and these super thin sections were observed by a transmission electron microscope while unstained. The polytetrafluoroethylene was observed as dark portions, but no aggregates or fibrils exceeding 10 μm were found.

Reference Example 4

Polytetrafluoroethylene-Containing Powder Mixture (C-2)

In a mixed solution of 75 parts of dodecyl methacrylate and 25 parts of methyl methacrylate, 0.1 parts of azobis-dimethylvaleronitrile was dissolved. In the mixture, a mixed solution of 2.0 parts of sodium dodecylbenzenesulfonate and 300 parts of distilled water was added and, after stirring using a homomixer at 10000 rpm for 4 minutes, it was passed through a homogenizer twice at a pressure of 300 kg/cm$^2$ to obtain a stable dodecyl methacrylate/methylmethacrylate preliminary dispersion. This dispersion was then charged into a separable flask equipped with a stirrer, a condenser, a thermocouple and a nitrogen inlet, and the mixture was raised to an internal temperature of 80° C. in a nitrogen gas flow and stirred for 3 hours for radical polymerization to obtain a dodecyl methacrylate/methyl methacrylate copolymer particle dispersion (hereunder referred to as P-2).

The solid concentration of P-2 was 25.1% and the particle size distribution showed a single peak, and the weight average particle size was 198 nm.

160 Parts (40 parts of polytetrafluoroethylene) of F-1 used in Reference Example 1 and 159.4 parts of P-2 (40 parts of dodecyl methacrylate/methyl methacrylate polymer) were charged in a separable flask equipped with a stirrer, a thermocouple, a nitrogen inlet and a dropping funnel, and the mixture was stirred in a nitrogen gas flow at room temperature for one hour. The system was heated to 80° C. and, after adding a mixed solution of 0.005 parts of iron sulfate, 0.003 parts of disodium ethylenediaminetetraacetate, 0.24 parts of rongalite salt and 10 parts of distilled water, a mixed solution of 20 parts of methyl methacrylate and 0.1 parts of tertiary-butyl peroxide was added dropwise over 30 minutes. After the completion of the dropwise addition, the radical polymerization was completed by maintaining the internal temperature at 80° C. for one hour. No separation of solids was observed throughout the series of procedures, and a uniform particle dispersion was obtained. The solid concentration of the resulting particle dispersion was 28.5% by weight, and the particle size distribution was relatively broad and the weight average particle size was 248 nm.

After charging 349.7 parts of this particle dispersion into 600 parts of hot water containing 5 parts of calcium chloride at 75° C., the solids were separated, filtered and dried to obtain 97 parts of a polytetrafluoroethylene-containing powder mixture (C-2).

The dried polytetrafluoroethylene-containing powder mixture (C-2) was shaped into a thin strip using a press molding machine at 220° C. and then cut into super-thin sections using a microtome, and these super-thin sections were observed by a transmission electron microscope while unstained. The polytetrafluoroethylene was observed as dark portions, but no aggregates or fibrils exceeding 10 μm were found.

Reference Example 5

Masterbatch (M-1) of Polytetrafluoroethylene-Containing Powder Mixture

75 Parts of straight-chain homopolypropylene pellets ("EA7" manufactured by Japan Polychem Corp., MFR: 1.2 g/10 min) were hand blended with 25 parts of the polytetrafluoroethylene-containing powder mixture (C-2) obtained in Reference Example 4 and the blend was melt-kneaded at a barrel temperature of 200° C. and a screw rotation rate of 200 rpm using a twin-screw extruder ("ZSK30" manufactured by WERNER & PFLEIDERER Co.) and shaped into pellets to obtain a masterbatch of a polytetrafluoroethylene-containing powder mixture (hereinafter referred to as M-1).

Measurement of the solid concentration or the like in the above-described Reference Examples was accomplished according to the following methods.

(1) Solid concentration: It was determined by drying the particle dispersion at 170° C. for 30 minutes.

(2) Particle size distribution and weight average particle size: A sample solution prepared by diluting a particle dispersion with water was measured by the dynamic light scattering method ("ELS800" by Otsuka Electronics Co., Ltd., temperature: 25° C., scattering angle: 90 degrees).

(3) Reduced viscosity ($\eta$ sp/C): A solution prepared by dissolving 0.1 g of a polymer in 100 ml of chloroform was measured at 25° C.

Examples 1 to 26 and Comparative Examples 1 to 25

The following polypropylenes were mixed with acrylic polymers (B-1 to B-2) obtained in the above-described Reference Examples, the polytetrafluoroethylene-containing powder mixtures (C-1 to C-2) or master pellets (M-1) and fillers in the proportions (parts) shown in Tables 1 to 4 and the mixtures were extrusion molded under the following conditions using the following molding machine to produce molded articles of thermoplastic resin compositions.

With respect to the resulting molded articles, occurrence of die deposit, appearance of the molded articles and occurrence of plate-out were evaluated in the following manner. The results are shown in Tables 1 to 4.

In Tables 1 to 4, CD-123 is a commercially available powdered polytetrafluoroethylene ("FLUON CD123" manufactured by Asahi ICI Fluoropolymers Co., Ltd., molecular weight: 120,000,000) which is not treated with an organic polymer.

Polypropylene: "NOVATEC PP" Manufactured by Japan Polychem Corp.
"BC06C": MFR; 60 g/10 min
"BC03C": MFR; 30 g/10 min
"FY-6C": MFR; 2.4 g/10 min Extrusion Molding Machine: Manufactured by IKG Co.
Screw diameter: 50 mm single-screw extruder, rotation rate: 50 rpm
Dies shape: width; 80 mm, thickness; 3 mm Occurrence of Die Deposit
The time required to the occurrence of die deposit was measured.

Appearance of Molded Article
The appearance of the sheet was visually observed and evaluated according to the following criteria.
○: good
×: some surface irregularities or burr Plate-Out
Using a twin-roll mill, the roll surface during molding was visually observed.
○: no plate-out
Δ: slightly contaminated roll surface
×: noticeably contaminated roll surface

TABLE 1

| Components (Parts) | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Thermoplastic resin (A) | | | | | | | | | | | | | |
| BC06C | 100 | | | 100 | 100 | 100 | 100 | 100 | 100 | 100 | 45 | 100 | 100 |
| BC03C | | 100 | | | | | | | | | | | |
| FY-6C | | | 100 | | | | | | | | | | |
| Acrylic polymer (B) | | | | | | | | | | | | | |
| B-1 | 5 | 5 | 5 | 0.5 | 10 | 18 | | | | 5 | 5 | 5 | 5 |
| B-2 | | | | | | | 0.5 | 10 | 18 | | | | |
| PTFE-containing powder mixture (C) | | | | | | | | | | | | | |
| C-1 | | | | | | | | | | | 15 | | |
| C-2 | 15 | 15 | 15 | 15 | 15 | 15 | 15 | 15 | 15 | | | 0.25 | 5 |
| M-1 | | | | | | | | | | 60 | | | |
| CD-123 | | | | | | | | | | | | | |
| Amount of PTFE component | 6 | 6 | 6 | 6 | 6 | 6 | 6 | 6 | 6 | 6 | 6 | 0.1 | 2 |
| Filler (D) | | | | | | | | | | | | | |
| Magnesium hydroxide | 210 | 210 | 210 | 210 | 210 | 210 | 210 | 210 | 210 | 210 | 210 | 20 | 110 |
| Physical properties | | | | | | | | | | | | | |
| Occurrence of die deposit (min) | 88 | 82 | 78 | 66 | 105 | 115 | 50 | 80 | 88 | 72 | 76 | 79 | 84 |
| Appearance of molded article | ○ | ○ | ○ | ○ | ○ | ○ | ○ | ○ | ○ | ○ | ○ | ○ | ○ |
| Plate-out | ○ | ○ | ○ | ○ | ○ | ○ | ○ | ○ | ○ | ○ | ○ | ○ | ○ |

TABLE 2

| Components (Parts) | Examples | | | | | | | | | | | | |
|---|---|---|---|---|---|---|---|---|---|---|---|---|---|
| | 14 | 15 | 16 | 17 | 18 | 19 | 20 | 21 | 22 | 23 | 24 | 25 | 26 |
| Thermoplastic resin (A) | | | | | | | | | | | | | |
| BC06C | 100 | | | 100 | 100 | 100 | 100 | 100 | 100 | 100 | 100 | 100 | 100 |
| BC03C | | 100 | 100 | | | | | | | | | | |
| FY-6C | | | | | | | | | | | | | |
| Acrylic polymer (B) | | | | | | | | | | | | | |
| B-1 | 5 | 5 | 5 | 5 | 5 | 5 | 5 | 5 | 5 | 5 | 5 | 5 | 5 |
| B-2 | | | | | | | | | | | | | |
| PTFE-containing powder mixture (C) | | | | | | | | | | | | | |
| C-1 | | | | | | | | | | | | | |
| C-2 | 45 | 15 | 15 | 15 | 15 | 15 | 15 | 15 | 15 | 15 | 15 | 15 | 15 |
| M-1 | | | | | | | | | | | | | |
| CD-123 | | | | | | | | | | | | | |
| Amount of PTFE component | 18 | 6 | 6 | 6 | 6 | 6 | 6 | 6 | 6 | 6 | 6 | 6 | 6 |
| Filler (D) | | | | | | | | | | | | | |
| Magnesium hydroxide | 280 | | | | | | | | | | | | |
| Paper | | 210 | | | | | | | | | | | |
| waste paper | | | 210 | | | | | | | | | | |
| Calcium carbonate | | | | 210 | | | | | | | | | |
| Aluminum powder | | | | | 210 | | | | | | | | |
| Talc | | | | | | 210 | | | | | | | |
| Wood flour | | | | | | | 210 | | | | | | |
| Barium sulfate | | | | | | | | 210 | | | | | |
| Silicon carbide | | | | | | | | | 210 | | | | |
| Graphite | | | | | | | | | | 210 | | | |
| Carbon black | | | | | | | | | | | 210 | | |
| Silk powder | | | | | | | | | | | | 210 | |
| Acetate powder | | | | | | | | | | | | | 210 |
| Physical properties | | | | | | | | | | | | | |
| Occurrence of die deposit (min) | 48 | 73 | 70 | 78 | 80 | 73 | 76 | 71 | 74 | 94 | 65 | 77 | 70 |
| Appearance of molded article | ○ | ○ | ○ | ○ | ○ | ○ | ○ | ○ | ○ | ○ | ○ | ○ | ○ |
| Plate-out | ○ | ○ | ○ | ○ | ○ | ○ | ○ | ○ | ○ | ○ | ○ | ○ | ○ |

TABLE 3

| Components (Parts) | Comparative Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Thermoplastic resin (A) | | | | | | | | | | | | | |
| BC06C | 100 | 100 | 100 | 100 | 100 | 100 | 100 | 100 | 100 | 100 | 100 | 100 | 100 |
| BC03C | | | | | | | | | | | | | |
| FY-6C | | | | | | | | | | | | | |
| Acrylic polymer (B) | | | | | | | | | | | | | |
| B-1 | | 0.05 | 21 | | | 0.05 | 21 | | | | 5 | 5 | 5 |
| B-2 | | | | | | | | 0.05 | 21 | | | | |
| PTFE-containing powder mixture (C) | | | | | | | | | | | | | |
| C-1 | | | | | 15 | | | | | | | | |
| C-2 | | | | | | 15 | 15 | 15 | 15 | | | 0.03 | 60 |
| M-1 | | | | | | | | | | 60 | | | |
| CD-123 | | | | | | | | | | | 15 | | |
| Filler (D) | | | | | | | | | | | | | |
| Magnesium hydroxide | 210 | 210 | 210 | 210 | 210 | 210 | 210 | 210 | 210 | 210 | 210 | 210 | 210 |
| Physical properties | | | | | | | | | | | | | |
| Occurrence of die deposit (min) | 17 | 22 | 36 | 26 | 33 | 36 | 44 | 29 | 35 | 35 | 19 | 45 | 50 |

TABLE 3-continued

|  | Comparative Examples | | | | | | | | | | | | |
|---|---|---|---|---|---|---|---|---|---|---|---|---|---|
| Components (Parts) | 1 | 2 | 3 | 4 | 5 | 6 | 7 | 8 | 9 | 10 | 11 | 12 | 13 |
| Appearance of molded article | X | X | X | Δ | Δ | Δ | Δ | Δ | Δ | X | X | X | X |
| Plate-out | X | X | X | X | X | X | ○ | X | ○ | ○ | X | X | ○ |

TABLE 4

|  | Comparative Examples | | | | | | | | | | | |
|---|---|---|---|---|---|---|---|---|---|---|---|---|
| Components (Parts) | 14 | 15 | 16 | 17 | 18 | 19 | 20 | 21 | 22 | 23 | 24 | 25 |
| Thermoplastic resin (A) | | | | | | | | | | | | |
| BC06C | 100 | 100 | 100 | 100 | 100 | 100 | | | | | | |
| BC03C | | | | | | | 100 | | 100 | | 100 | |
| FY-6C | | | | | | | | 100 | | 100 | | 100 |
| Acrylic polymer (B) | | | | | | | | | | | | |
| B-1 | | | | | | | | | 5 | 5 | | |
| B-2 | 5 | 5 | 5 | | | | | | | | | |
| PTFE-containing powder mixture (C) | | | | | | | | | | | | |
| C-1 | | | | | | | | | | | | |
| C-2 | | 0.03 | 60 | 0.03 | 60 | | | | | | 15 | 15 |
| M-1 | | | | | | | | | | | | |
| CD-123 | 15 | | | | | | | | | | | |
| Filler (D) | | | | | | | | | | | | |
| Magnesium hydroxide | 210 | 210 | 210 | 210 | 210 | 210 | 210 | 210 | 210 | 210 | 210 | 210 |
| Physical properties | | | | | | | | | | | | |
| Occurrence of die deposit (min) | 14 | 34 | 37 | 18 | 33 | 17 | 18 | 15 | 41 | 38 | 30 | 28 |
| Appearance of molded article | X | X | X | X | X | X | X | X | X | X | X | X |
| Plate-out | X | X | ○ | X | ○ | X | X | X | X | X | X | X |

Examples 27 to 52 and Comparative Examples 26 to 50

The following polypropylenes were mixed with acrylic polymers (B-1 to B-2) obtained in the above-described Reference Examples, the polytetrafluoroethylene-containing powder mixtures (C-1 to C-2) or master pellets (M-1) and fillers in the proportions shown in Tables 5 to 8 and the mixtures were extrusion molded under the following conditions using the following molding machine to produce molded articles of thermoplastic resin compositions.

With respect to the resulting molded articles, occurrence of die deposit, appearance of the molded articles and occurrence of plate-out were evaluated in the following manner. The results are shown in Tables 5 to 8.

In Tables 5 to 8, CD-123 is a commercially available powdered polytetrafluoroethylene ("FLUON CD123" manufactured by Asahi ICI Fluoropolymers Co., Ltd., molecular weight: 120,000,000) which is not treated with an organic polymer.

Polyethylene: "NOVATEC" Manufactured by Japan Polychem Corp.
 "HD HY540" (HDPE): MFR; 1.0 g/10 min
 "LD LJ801N" (LDPE): MFR; 30 g/10 min
 "UE 320" (LLDPE): MFR; 0.7 g/10 min

TABLE 5

|  | Examples | | | | | | | | | | | | |
|---|---|---|---|---|---|---|---|---|---|---|---|---|---|
| Components (Parts) | 27 | 28 | 29 | 30 | 31 | 32 | 33 | 34 | 35 | 36 | 37 | 38 | 39 |
| Thermoplastic resin (A) | | | | | | | | | | | | | |
| HY540 | 100 | | | 100 | 100 | 100 | 100 | 100 | 100 | 100 | 45 | 100 | 100 |
| LJ801N | | 100 | | | | | | | | | | | |
| UE320 | | | 100 | | | | | | | | | | |

TABLE 5-continued

| Components (Parts) | Examples | | | | | | | | | | | | |
|---|---|---|---|---|---|---|---|---|---|---|---|---|---|
| | 27 | 28 | 29 | 30 | 31 | 32 | 33 | 34 | 35 | 36 | 37 | 38 | 39 |
| Acrylic polymer (B) | | | | | | | | | | | | | |
| B-1 | 5 | 5 | 5 | 0.5 | 10 | 18 | | | | 5 | 5 | 5 | 5 |
| B-2 | | | | | | | 0.5 | 10 | 18 | | | | |
| PTFE-containing powder mixture (C) | | | | | | | | | | | | | |
| C-1 | | | | | | | | | | 15 | | | |
| C-2 | 15 | 15 | 15 | 15 | 15 | 15 | 15 | 15 | 15 | | | 0.3 | 5 |
| M-1 | | | | | | | | | | | 60 | | |
| CD-123 | | | | | | | | | | | | | |
| Amount of PTFE component | 6 | 6 | 6 | 6 | 6 | 6 | 6 | 6 | 6 | 6 | 6 | 0.1 | 2 |
| Filler (D) | | | | | | | | | | | | | |
| Magnesium hydroxide | 210 | 210 | 210 | 210 | 210 | 210 | 210 | 210 | 210 | 210 | 210 | 20 | 110 |
| Physical properties | | | | | | | | | | | | | |
| Occurrence of die deposit (min) | 80 | 75 | 71 | 60 | 96 | 105 | 46 | 73 | 80 | 66 | 69 | 72 | 76 |
| Appearance of molded | ○ | ○ | ○ | ○ | ○ | ○ | ○ | ○ | ○ | ○ | ○ | ○ | ○ |
| Plate-out | ○ | ○ | ○ | ○ | ○ | ○ | ○ | ○ | ○ | ○ | ○ | ○ | ○ |

TABLE 6

| Components (Parts) | Examples | | | | | | | | | | | | |
|---|---|---|---|---|---|---|---|---|---|---|---|---|---|
| | 40 | 41 | 42 | 43 | 44 | 45 | 46 | 47 | 48 | 49 | 50 | 51 | 52 |
| Thermoplastic resin (A) | | | | | | | | | | | | | |
| HY540 | 100 | | | 100 | 100 | 100 | 100 | 100 | 100 | 100 | 100 | 100 | 100 |
| LJ801N | | 100 | 100 | | | | | | | | | | |
| UE320 | | | | | | | | | | | | | |
| Acrylic polymer (B) | | | | | | | | | | | | | |
| B-1 | 5 | 5 | 5 | 5 | 5 | 5 | 5 | 5 | 5 | 5 | 5 | 5 | 5 |
| B-2 | | | | | | | | | | | | | |
| PTFE-containing powder mixture (C) | | | | | | | | | | | | | |
| C-1 | | | | | | | | | | | | | |
| C-2 | 45 | 15 | 15 | 15 | 15 | 15 | 15 | 15 | 15 | 15 | 15 | 15 | 15 |
| M-1 | | | | | | | | | | | | | |
| CD-123 | | | | | | | | | | | | | |
| Amount of PTFE component | 18 | 6 | 6 | 6 | 6 | 6 | 6 | 6 | 6 | 6 | 6 | 6 | 6 |
| Filler (D) | | | | | | | | | | | | | |
| Magnesium hydroxide | 280 | | | | | | | | | | | | |
| Paper | | 210 | | | | | | | | | | | |
| Waste paper | | | 210 | | | | | | | | | | |
| Calcium carbonate | | | | 210 | | | | | | | | | |
| Aluminum powder | | | | | 210 | | | | | | | | |
| Talc | | | | | | 210 | | | | | | | |
| Wood flour | | | | | | | 210 | | | | | | |
| Barium sulfate | | | | | | | | 210 | | | | | |
| Silicon carbide | | | | | | | | | 210 | | | | |
| Graphite | | | | | | | | | | 210 | | | |
| Carbon black | | | | | | | | | | | 210 | | |
| Silk powder | | | | | | | | | | | | 210 | |
| Acetate powder | | | | | | | | | | | | | 210 |
| Physical properties | | | | | | | | | | | | | |
| Occurrence of die deposit (min) | 44 | 66 | 63 | 71 | 73 | 66 | 69 | 64 | 67 | 86 | 59 | 70 | 63 |
| Appearance of molded article | ○ | ○ | ○ | ○ | ○ | ○ | ○ | ○ | ○ | ○ | ○ | ○ | ○ |
| Plate-out | ○ | ○ | ○ | ○ | ○ | ○ | ○ | ○ | ○ | ○ | ○ | ○ | ○ |

TABLE 7

| | Comparative Examples | | | | | | | | | | | | |
|---|---|---|---|---|---|---|---|---|---|---|---|---|---|
| Components (Parts) | 26 | 27 | 28 | 29 | 30 | 31 | 32 | 33 | 34 | 35 | 36 | 37 | 38 |
| Thermoplastic resin (A) | | | | | | | | | | | | | |
| HY540 | 100 | 100 | 100 | 100 | 100 | 100 | 100 | 100 | 100 | 100 | 100 | 100 | 100 |
| LJ801N | | | | | | | | | | | | | |
| UE320 | | | | | | | | | | | | | |
| Acrylicpolymer (B) | | | | | | | | | | | | | |
| B-1 | | 0.05 | 21 | | | 0.05 | 21 | | | | 5 | 5 | 5 |
| B-2 | | | | | | | | 0.05 | 21 | | | | |
| PTFE-containing powder mixture (C) | | | | | | | | | | | | | |
| C-1 | | | | 15 | | | | | | | | | |
| C-2 | | | | | 15 | 15 | 15 | 15 | 15 | | | 0.03 | 60 |
| M-1 | | | | | | | | | | 60 | | | |
| CD-123 | | | | | | | | | | | 15 | | |
| Filler (D) | | | | | | | | | | | | | |
| Magnesium hydroxide | 210 | 210 | 210 | 210 | 210 | 210 | 210 | 210 | 210 | 210 | 210 | 210 | 210 |
| Physical properties | | | | | | | | | | | | | |
| Occurrence of die deposit (min) | 16 | 20 | 33 | 24 | 30 | 33 | 40 | 27 | 32 | 32 | 17 | 41 | 46 |
| Appearance of molded article | X | X | X | X | X | X | X | X | X | X | X | X | X |
| Plate-out | X | X | X | X | X | X | Δ | X | Δ | Δ | X | X | Δ |

TABLE 8

| | Comparative Examples | | | | | | | | | | | |
|---|---|---|---|---|---|---|---|---|---|---|---|---|
| Components (Parts) | 39 | 40 | 41 | 42 | 43 | 44 | 45 | 46 | 47 | 48 | 49 | 50 |
| Thermoplastic resin (A) | | | | | | | | | | | | |
| HY540 | 100 | 100 | 100 | 100 | 100 | 100 | | | | | | |
| LJ801N | | | | | | | 100 | | 100 | | 100 | |
| UE320 | | | | | | | | 100 | | 100 | | 100 |
| Acrylic polymer (B) | | | | | | | | | | | | |
| B-1 | | | | | | | | | 5 | 5 | | |
| B-2 | 5 | 5 | 5 | | | | | | | | | |
| PTFE-containing powder mixture (C) | | | | | | | | | | | | |
| C-1 | | | | | | | | 0.05 | | | | |
| C-2 | | 0.03 | 60 | 0.03 | 60 | | | | | | 15 | 15 |
| M-1 | | | | | | | | | | | | |
| CD-123 | 15 | | | | | | | | | | | |
| Filler (D) | | | | | | | | | | | | |
| Magnesium hydroxide | 210 | 210 | 210 | 210 | 210 | 210 | 210 | 210 | 210 | 210 | 210 | 210 |
| Physical properties | | | | | | | | | | | | |
| Occurrence of die deposit (min) | 17 | 16 | 49 | 18 | 61 | 18 | 18 | 15 | 18 | 15 | 18 | 15 |
| Appearance of molded article | X | X | X | X | X | X | X | X | X | X | X | X |
| Plate-out | X | X | Δ | X | Δ | X | X | X | X | X | X | X |

Example 53 to 75 and Comparative Examples 51 to 72

The following thermoplastic resins were mixed with acrylic polymers (B-1 to B-2) obtained in the above-described Reference Examples, the polytetrafluoroethylene-containing powder mixtures (C-1 to C-2) or master pellets (M-1) and fillers in the proportions (parts) shown in Tables 9 to 12 and the mixtures were extrusion molded under the following conditions using the following molding machine to produce molded articles of thermoplastic resin compositions.

With respect to the resulting molded articles, occurrence of die deposit, appearance of the molded articles and occurrence of plate-out were evaluated in the following manner. The results are shown in Tables 9 to 12.

In Tables 9 to 12, CD-123 is a commercially available powdered polytetrafluoroethylene ("FLUON CD123" manufactured by Asahi ICI Fluoropolymers Co., Ltd., molecular weight: 120,000,000) which is not treated with an organic polymer.

Thermoplastic Resin:

Metallocene Polyethylene: "CARNEL" Manufactured by Japan Polychem Corp.
 "KS 240" (PE): MFR; 2.2 g/10 min Polyvinyl Chloride: "SHIN-ETSU VINYL CHLORIDE COMPOUND" Manufactured by Shin-Etsu Polymer Co., Ltd.
 "EX 282E" (PVC)

Polystyrene: Manufactured by A&M Styrene Corp.
 "SC001" (PS): MFR; 3.7 g/10 min

Impact-Resistant Polystyrene: Manufactured by Nippon Polystyrene Co., Ltd.
 "H450K" (HIPS)

Poly-1-butene: "VIEWRON" Manufactured by Mitsui Petrochemical Industries, Ltd.
 "P5040B": MFR; 0.4 g/10 min Copolymer of Acrylonitrile and Styrene: "STYLACK" Manufactured by Asahi Kasei Corporation
 "AS783" (AS): MFR; 9.0 g/10 min Rubber-Reinforced Copolymer (ABS, ASA, SAS) of Acrylonitrile and Styrene: "DIAPET ABS" Manufactured by Mitsubishi Rayon Co., Ltd.
 "SW-3" (ABS): MFR; 0.4 g/10 min Methacryl Resin: "ACRYPET" Manufactured by Mitsubishi Rayon Co., Ltd.
 "VH" (MMA): MFR; 0.4 g/10 min Polycarbonate: "NOVALEX" Manufactured by Mitsubishi Engineering-Plastics Corporation
 "7030A" (PC): MFR; 3.5 g/10 min Polyethylene terephthalate: "DIANITE" Manufactured by Mitsubishi Rayon Co., Ltd.
 "PA-200" (PET)

Polybutylene terephthalate: "TAFPET" Manufactured by Mitsubishi Rayon Co., Ltd.
 "N-1000" (PBT)

Cyclic polyolefin Such as Copolymer of polymethylpentene, cyclopentadiene and ethylene and/or propylene: Manufactured by Mitsui Petrochemical Industries, Ltd.
 "MX001" (PMP): MFR; 26 g/10 min Ethylene-vinyl acetate copolymer: "NOVATEC EVA" Manufactured by Japan Polychem Corp.
 "LV260": MFR; 8.5 g/10 min 2,6-dimethyl-1,4-phenylene ether
 reduced viscosity (ηsp/c)=0.59 dl/g
 (PPE)

Polycaproamide: Manufactured by Toray Corporation
 "CM1017" (PA6)

Polyhexamethyleneadipamide: Manufactured by Toray Industries, Ltd.
 "CM3001N" (PA66)

Polylactic acid Resin: Manufactured by Shimadzu Corporation
 "LACTY 9400" (biodegradable resin)

Recycled PP: Pellets Obtained by Grinding Automobile Bumpers Made Mainly of Polypropylene were Used.

TABLE 9

| Components (Parts) | Examples | | | | | | | | | | | | |
|---|---|---|---|---|---|---|---|---|---|---|---|---|---|
| | 53 | 54 | 55 | 56 | 57 | 58 | 59 | 60 | 61 | 62 | 63 | 64 | 65 |
| Thermoplastic resin (A) | | | | | | | | | | | | | |
| KS240 | 100 | | | | | | | | | | | | |
| EX282E | | 100 | | | | | | | | | | | |
| SC001 | | | 100 | | | | | | | | | | |
| H450K | | | | 100 | | | | | | | | | |
| P5040B | | | | | 100 | | | | | | | | |
| AS783 | | | | | | 100 | | | | | | | |
| SW-3 | | | | | | | 100 | 100 | 100 | 100 | 100 | 100 | |
| VH | | | | | | | | | | | | | 100 |
| Acrylic polymer (B) | | | | | | | | | | | | | |
| B-1 | 5 | 5 | 5 | 5 | 5 | 5 | 5 | | 5 | | 5 | 5 | 5 |
| B-2 | | | | | | | | 5 | | 5 | | | |
| PTFE-containing powder mixture (C) | | | | | | | | | | | | | |
| C-1 | | | | | | | | | | | 15 | 15 | |
| C-2 | 15 | 15 | 15 | 15 | 15 | 15 | 15 | 15 | | | 15 | 15 | 15 |
| CD-123 | | | | | | | | | | | | | |
| Amount of PTFE component | 6 | 6 | 6 | 6 | 6 | 6 | 6 | 6 | 6 | 6 | 6 | 6 | 6 |
| Filler (D) | | | | | | | | | | | | | |
| Magnesium hydroxide | 210 | 210 | 210 | 210 | 210 | 210 | 210 | 210 | 210 | 210 | | | 210 |
| Talc | | | | | | | | | | | 210 | | |
| Wood flour | | | | | | | | | | | | 210 | |

TABLE 9-continued

| Components (Parts) | Examples |  |  |  |  |  |  |  |  |  |  |  |  |
|---|---|---|---|---|---|---|---|---|---|---|---|---|---|
|  | 53 | 54 | 55 | 56 | 57 | 58 | 59 | 60 | 61 | 62 | 63 | 64 | 65 |
| Physical properties |  |  |  |  |  |  |  |  |  |  |  |  |  |
| Occurrence of die deposit (min) | 39 | 46 | 33 | 51 | 61 | 38 | 52 | 41 | 54 | 44 | 54 | 43 | 30 |
| Appearance of molded article | ○ | ○ | ○ | ○ | ○ | ○ | ○ | ○ | ○ | ○ | ○ | ○ | ○ |
| Plate-out | ○ | ○ | ○ | ○ | ○ | ○ | ○ | ○ | ○ | ○ | ○ | ○ | ○ |

TABLE 10

| Components (Parts) | Examples |  |  |  |  |  |  |  |  |  |
|---|---|---|---|---|---|---|---|---|---|---|
|  | 66 | 67 | 68 | 69 | 70 | 71 | 72 | 73 | 74 | 75 |
| Thermoplastic resin (A) |  |  |  |  |  |  |  |  |  |  |
| 7030A | 100 |  |  |  |  |  |  |  |  |  |
| PA-200 |  | 100 |  |  |  |  |  |  |  |  |
| N-1000 |  |  | 100 |  |  |  |  |  |  |  |
| MX001 |  |  |  | 100 |  |  |  |  |  |  |
| LV260 |  |  |  |  | 100 |  |  |  |  |  |
| PPE |  |  |  |  |  | 100 |  |  |  |  |
| CM1017 |  |  |  |  |  |  | 100 |  |  |  |
| CM3001N |  |  |  |  |  |  |  | 100 |  |  |
| 9400 |  |  |  |  |  |  |  |  | 100 |  |
| Recycled PP |  |  |  |  |  |  |  |  |  | 100 |
| Acrylic polymer (B) |  |  |  |  |  |  |  |  |  |  |
| B-1 | 5 | 5 | 5 | 5 | 5 | 5 | 5 | 5 | 5 | 5 |
| B-2 |  |  |  |  |  |  |  |  |  |  |
| PTFE-containing powder mixture (C) |  |  |  |  |  |  |  |  |  |  |
| C-1 |  |  |  |  |  |  |  |  |  |  |
| C-2 | 15 | 15 | 15 | 15 | 15 | 15 | 15 | 15 | 15 | 15 |
| CD-123 |  |  |  |  |  |  |  |  |  |  |
| Amount of PTFE component | 6 | 6 | 6 | 6 | 6 | 6 | 6 | 6 | 6 | 6 |
| Filler (D) |  |  |  |  |  |  |  |  |  |  |
| Magnesium hydroxide | 210 | 210 | 210 | 210 | 210 | 210 | 210 | 210 | 210 | 210 |
| Talc |  |  |  |  |  |  |  |  |  |  |
| Wood flour |  |  |  |  |  |  |  |  |  |  |
| Physical properties |  |  |  |  |  |  |  |  |  |  |
| Occurrence of die deposit (min) | 71 | 48 | 39 | 44 | 38 | 38 | 38 | 38 | 41 | 76 |
| Appearance of molded article | ○ | ○ | ○ | ○ | ○ | ○ | ○ | ○ | ○ | ○ |
| Plate-out | ○ | ○ | ○ | ○ | ○ | ○ | ○ | ○ | ○ | ○ |

TABLE 11

| Components (Parts) | Comparative Examples |  |  |  |  |  |  |  |  |  |  |  |  |
|---|---|---|---|---|---|---|---|---|---|---|---|---|---|
|  | 51 | 52 | 53 | 54 | 55 | 56 | 57 | 58 | 59 | 60 | 61 | 62 | 63 |
| Thermoplastic resin (A) |  |  |  |  |  |  |  |  |  |  |  |  |  |
| SW-3 | 100 | 100 | 100 | 100 | 100 | 100 | 100 | 100 | 100 | 100 | 100 | 100 | 100 |
| EX282E |  |  |  |  |  |  |  |  |  |  |  |  |  |
| SC001 |  |  |  |  |  |  |  |  |  |  |  |  |  |
| Acrylicpolymer (B) |  |  |  |  |  |  |  |  |  |  |  |  |  |
| B-1 |  | 0.05 | 21 |  |  | 0.05 | 21 |  |  | 5 | 5 | 5 |  |
| B-2 |  |  |  |  |  |  |  | 0.05 | 21 |  |  |  | 5 |

TABLE 11-continued

|  | Comparative Examples | | | | | | | | | | | | |
|---|---|---|---|---|---|---|---|---|---|---|---|---|---|
| Components (Parts) | 51 | 52 | 53 | 54 | 55 | 56 | 57 | 58 | 59 | 60 | 61 | 62 | 63 |
| PTFE-containing powder mixture (C) | | | | | | | | | | | | | |
| C-1 | | | | 15 | | | | | | | | | |
| C-2 | | | | | 15 | 15 | 15 | 15 | 15 | | 0.03 | 60 | |
| CD-123 | 15 | 15 | 15 | | | | | | | 15 | | | 15 |
| Amount of PTFE component | | | | | | | | | | | | | |
| Filler (D) | | | | | | | | | | | | | |
| Magnesium hydroxide | 210 | 210 | 210 | 210 | 210 | 210 | 210 | 210 | 210 | 210 | 210 | 210 | 210 |
| Physical properties | | | | | | | | | | | | | |
| Occurrence of die deposit (min) | 14 | 16 | 21 | 21 | 24 | 23 | 30 | 20 | 22 | 21 | 27 | 26 | 17 |
| Appearance of molded article | X | X | X | X | X | X | X | X | X | X | X | X | X |
| Plate-out | X | X | X | X | X | X | X | X | X | X | X | Δ | X |

TABLE 12

|  | Comparative Examples | | | | | | | | |
|---|---|---|---|---|---|---|---|---|---|
| Components (Parts) | 64 | 65 | 66 | 67 | 68 | 69 | 70 | 71 | 72 |
| Thermoplastic resin (A) | | | | | | | | | |
| SW-3 | 100 | 100 | 100 | 100 | 100 | | | | |
| EX282E | | | | | | 100 | | | |
| SC001 | | | | | | | 100 | | |
| 9400 | | | | | | | | 100 | |
| Recycled PP | | | | | | | | | 100 |
| Acrylic polymer (B) | | | | | | | | | |
| B-1 | | | | | | | | | |
| B-2 | | 5 | 5 | | | | | | |
| PTFE-containing powder mixture (C) | | | | | | | | | |
| C-1 | | | | | | | | | |
| C-2 | 0.03 | 60 | 0.03 | 60 | | | | | |
| CD-123 | | | | | | | | | |
| Amount of PTFE component | | | | | | | | | |
| Filler (D) | | | | | | | | | |
| Magnesium hydroxide | 210 | 210 | 210 | 210 | 210 | 210 | 210 | 210 | 210 |
| Physical properties | | | | | | | | | |
| Occurrence of die deposit (min) | 22 | 28 | 11 | 22 | 18 | 20 | 24 | 6 | 28 |
| Appearance of molded article | X | X | X | X | X | X | X | X | X |
| Plate-out | X | Δ | X | Δ | X | Δ | X | X | X |

Examples 76 to 81 and Comparative Examples 73 to 78

Polypropylene "NOVATEC PPFY-6C" manufactured by Japan Polychem Corp. was mixed with the acrylic polymer (B-1) obtained in the above-described Reference Examples, the polytetrafluoroethylene-containing powder mixture (C-2) and the filler (D) in the proportions (parts) shown in Table 13 and the mixtures were extrusion molded under the following conditions using the following molding machine to produce molded articles of thermoplastic resin compositions.

With respect to the resulting molded articles, occurrence of die deposit, appearance of the molded articles and occurrence of plate-out were evaluated in the same manner as in Example 1. The results are shown in Table 13.

Maleic Anhydride-Modified PP: "YUMEX 1010" Manufactured by Sanyo Chemical Industries, Ltd.

Acrylate-Modified Polyethylene: "ACRIFT WD201" Manufactured by Sumitomo Chemical Industries Co., Ltd.

TABLE 13

| Components (Parts) | Examples | | | | | | Comparative Examples | | | | | |
|---|---|---|---|---|---|---|---|---|---|---|---|---|
| | 76 | 77 | 78 | 79 | 80 | 81 | 73 | 74 | 75 | 76 | 77 | 78 |
| Thermoplastic resin (A) | | | | | | | | | | | | |
| FY-6C | 95 | 60 | 10 | 60 | 95 | 95 | 95 | 60 | 10 | 60 | 95 | 95 |
| Acrylic polymer (B) | | | | | | | | | | | | |
| B-1 | 5 | 5 | 5 | 50 | 10 | 10 | | | | | | |
| PTFE-containing powder mixture (C) | | | | | | | | | | | | |
| C-2 | 15 | 15 | 15 | 150 | 30 | 30 | | | | | | |
| Amount of PTFE component | 6 | 6 | 6 | 60 | 12 | 12 | | | | | | |
| Filler (D) | | | | | | | | | | | | |
| Magnesium hydroxide | 210 | 210 | 210 | 1900 | | | 210 | 210 | 210 | 1900 | | |
| Wood flour | | | | | 400 | | | | | | 400 | |
| Waste papers | | | | | | 400 | | | | | | 400 |
| Acid-modified PP 1010 | 5 | | | | 5 | 5 | 5 | | | | 5 | 5 |
| WD201 | | 40 | 90 | 40 | | | | 40 | 90 | 40 | | |
| Physical properties | | | | | | | | | | | | |
| Occurrence of die deposit (min) | 72 | 79 | 84 | 43 | 64 | 66 | 16 | 18 | 21 | 5 | 13 | 13 |
| Appearance of molded article | ◯ | ◯ | ◯ | ◯ | ◯ | ◯ | X | X | X | X | ◯ | ◯ |
| Plate-out | ◯ | ◯ | ◯ | ◯ | ◯ | ◯ | X | X | X | X | ◯ | ◯ |

As described above, according to the thermoplastic resin composition of the present invention, it is made possible to prevent die deposit and plate-out from occurring during molding even when fillers are added to various thermoplastic resins such as polyethylene resin, polypropylene resin, and styrene-based resin. Therefore, there can be produced a molded article which has improved continuous moldability, excellent productivity and good appearance.

What is claimed is:

1. A thermoplastic resin composition comprising a thermoplastic resin (A), an acrylic polymer (B), a polytetrafluoroethylene-containing powder mixture (C) and a filler (D), an amount of the acrylic polymer (B) being from 0.1 to 18 parts by weight, an amount of the filler (D) being from 1 to 2000 parts by weight, based on 100 parts by weight of the thermoplastic resin (A), wherein
    an amount of a polytetrafluoroethylene component in the polytetrafluoroethylene-containing powder mixture (C) is from 0.1 to 18 parts by weight based on 100 parts by weight of the thermoplastic resin (A), and
    wherein the acrylic polymer (B) comprises an acrylic monomer (b-1) containing an alkyl methacrylate and/or an alkyl acrylate, an alkyl group of which has 1 to 18 carbon atoms, and a reduced viscosity ($\eta$ sp/C) at 25° C. of a solution prepared by dissolving 0.1 g of the acrylic polymer in 100 ml of chloroform is 15 or less.

2. The thermoplastic resin composition according to claim 1, wherein the thermoplastic resin (A) contains 0.1 to 100% by weight of a modified polyolefin resin (E).

3. The thermoplastic resin composition according to claim 1, wherein the reduced viscosity ($\eta$ sp/C) of the acrylic polymer (B) is 3 or less.

4. The thermoplastic resin composition according to claim 1, wherein the acrylic monomer (b-1) further contains a vinyl monomer which is copolymerizable with the alkyl methacrylate and/or the alkyl acrylate, an alkyl group of which has 1 to 18 carbon atoms.

5. The thermoplastic resin composition according to claim 1, wherein the polytetrafluoroethylene-containing powder mixture (C) contains polytetrafluoroethylene particles having a particle size of 10 µm or less and an organic polymer.

6. The thermoplastic resin composition according to claim 1, wherein the polytetrafluoroethylene-containing powder mixture (C) is produced by mixing an aqueous dispersion of polytetrafluoroethylene particles having a particle size of 0.05 to 1.0 µm with an aqueous organic polymer dispersion and solidifying or spray drying the resultant to obtain powder.

7. The thermoplastic resin composition according to claim 1, wherein the polytetrafluoroethylene-containing powder mixture (C) is produced by polymerizing a monomer (c-1) constituting an organic polymer in the presence of an aqueous dispersion of polytetrafluoroethylene particles having a particle size of 0.05 to 1.0 µm and solidifying or spray drying the resultant to obtain powder.

8. The thermoplastic resin composition according to claim 1, wherein the polytetrafluoroethylene-containing powder mixture (C) is produced by subjecting a monomer (c-2) having an unsaturated ethylenic bond to emulsion polymerization in a dispersion prepared by mixing an aqueous dispersion of polytetrafluoroethylene particles having a particle size of 0.05 to 1.0 µm with an aqueous organic polymer dispersion and solidifying or spray drying the resultant to obtain powder.

9. A molded article comprising the thermoplastic resin composition of claim 1.

10. A method of producing the thermoplastic resin composition of claim 1, which comprises the steps of:
    producing master pellets containing a portion of a thermoplastic resin (A), an acrylic polymer (B) and a polytetrafluoroethylene-containing powder mixture (C); and
    mixing the remaining thermoplastic resin (A) and a filler (D) with the resulting master pellets.

11. A method of improving moldability of a thermoplastic resin composition comprising 100 parts by weight of a thermoplastic resin (A), 0.1 to 18 parts by weight of an acrylic polymer (B), a polytetrafluoroethylene-containing powder mixture (C) and 1 to 2000 parts by weight of a filler (D), which comprises the step of:

adding the polytetrafluoroethylene-containing powder mixture (C) so that an amount of a polytetrafluoroethylene component in the polytetrafluoroethylene-containing powder mixture (C) is from 0.1 to 18 parts by weight based on 100 parts by weight of the thermoplastic resin (A), and wherein the acrylic polymer (B) comprises an acrylic monomer (b-1) containing an alkyl methacrylate and/or an alkyl acrylate, an alkyl group of which has 1 to 18 carbon atoms, and a reduced viscosity ($\eta$ sp/C) at 25° C. of a solution prepared by dissolving 0.1 g of the acrylic polymer in 100 ml of chloroform is 15 or less.

* * * * *